Nov. 15, 1932.                E. PAPPERT                1,887,846
                            OPTICAL MOUNTING
                            Filed May 1, 1929

INVENTOR
Emanuel Pappert
BY
ATTORNEY

Patented Nov. 15, 1932

1,887,846

UNITED STATES PATENT OFFICE

EMANUEL PAPPERT, OF NEW YORK, N. Y.

OPTICAL MOUNTING

Application filed May 1, 1929. Serial No. 359,469.

This invention relates to connecting bridges for eyeglasses and spectacles and is particularly designed to rigidly connect certain types of non-metallic lens frames such as those made of celluloid, zylonite or other composition, and to provide simple and economical means for supporting the spectacles or eyeglasses upon the nose of the wearer.

It has heretofore been difficult to connect composition lens frames by means of a separate metal bridge and to maintain the spectacles so connected, comparatively rigid, particularly, if the bridge is removable. Clamps of various types at the ends of the bridge have heretofore been largely used for this purpose, but such clamps tend to put undue pressure upon the thin frame, to weaken the lens frame at the point of attachment, and to cut thereinto, and ultimately cause the lens frame to break at the point of attachment due to the unavoidable stress exerted by the bridge at that point, when the spectacles are taken off and put on by the wearer.

My invention contemplates the provision of a mounting which avoids the above objections, which is readily adjustable to the nose of the wearer in all directions, which connects the lens frames rigidly, and which nevertheless allows the easy insertion of the lens into its frame. My invention further may be readily applied to removable bridges, so that a bridge of such design as pleases the individual wearer may be connected to the lens frames. Furthermore, my improved mounting gives the pleasing appearance of a high bridge, while retaining the rigid connecting features of a low bridge.

Figure 1:
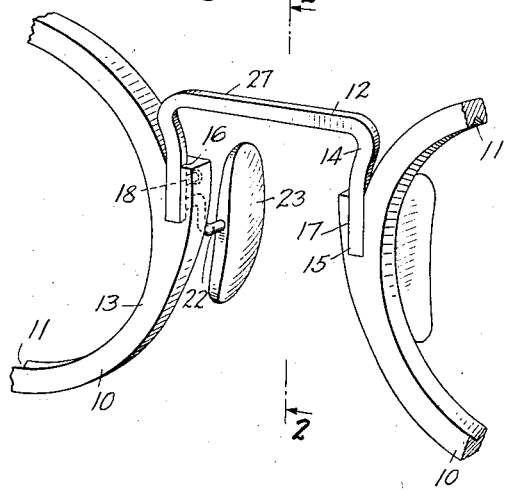
Figure 2:
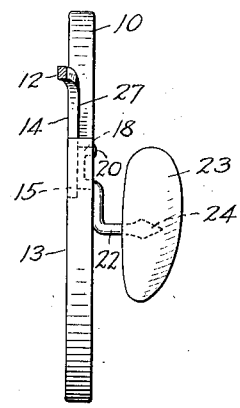
Figure 3:
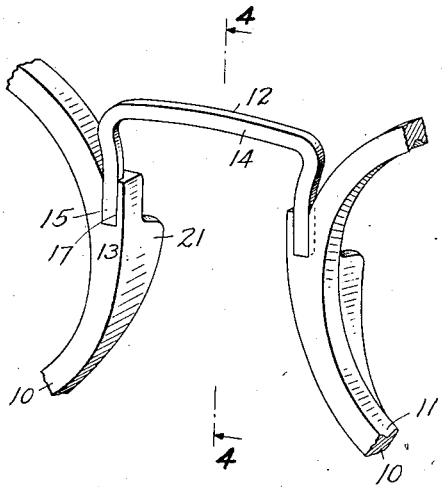
Figure 4:
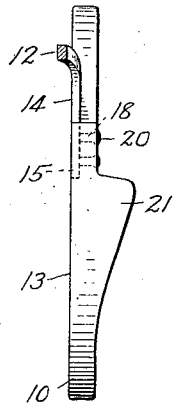

The various objects of my invention will be clear from the description which follows, and from the drawing, wherein, Fig. 1 is a perspective view of the preferred form of my improved mounting, Fig. 2 is a vertical section thereof, taken on the line 2—2 of Fig. 1, Fig. 3 is a view similar to Fig. 1 of a modified form of my invention, and Fig. 4 is a vertical section similar to Fig. 2, thereof.

In that practical embodiment of my invention which I have illustrated by way of example, the lens frames 10 are preferably made of suitable non-metallic composition such as celluloid, zylonite, or the like, and are each provided with the usual lens groove 11 for the reception of a suitable lens. The bridge 12 which I employ to connect the lens frames, is preferably made of flat metal wire, the front face 14 thereof being preferably set flush or even with the front face 13 of the lens frame. Toward this end, and for the purpose of making a rigid connection between the frames, and to prevent the metal at the ends of the bridge from cutting into the frame and thereby ultimately becoming loose at its connection under the stresses of handling, the ends 15 of the bridge are set into a suitable closely fitting groove as 16 in the lens frame and secured in place therein. The bridge end portions 15 remain visible and exposed from the front, giving the pleasing appearance of a high bridge, without sacrifice of rigidity.

The groove 16 is of substantially the same size and shape as the end 15 inserted thereinto, extending into the frame to a depth substantially equal to the thickness of said end and less than the thickness of the lens frame.

In order to prevent the side edges as 17 of the end 15 from cutting into the sides of the groove on the spreading apart of the lens frames as in handling, said end 15 is firmly secured in position against any movement relatively to the frame.

I prefer to do this by means of one or more fastener elements, such as rivets, screws or the like as 18, projecting rearwardly from the rear face 27 of the bridge. Said rivets may be integral with, screwed into, soldered or otherwise firmly secured to the end 15 and are preferably made in the form of wire of sufficient length to pass through the frame and to have a rivet head as 20 formed thereon.

As illustrated in Figs. 3 and 4, two spaced rivets are provided for the purpose of securing the bridge in place at each end 15, said rivets passing through suitable holes extending through the lens frame rearwardly from the front to the back thereof. Said rivets may be readily formed and secured to the end 15 of the bridge, by bending a piece of wire into U-shape, and securing the bottom of the U to the bridge end by soldering, while allowing the legs of the U to pass through the holes in the frame.

Referring again to Figs. 3 and 4, the usual non-metallic nose guard 21 may be provided as an extension on each of the lens frames and the frame enlarged in width, and if desired, in thickness, about the groove 16 for providing sufficient material to receive the bridge end 15.

As illustrated in Figs. 1 and 2, however, the nose guard may be omitted and separately formed so as to be readily adjustable. In that case, I replace the lower rivet or leg of the U, with a longer wire 22, of sufficient length to be bent first downwardly, adjacent the rear face of the frame, and then rearwardly of the lens frame, and to enter a suitable nose guard spaced rearwardly of the frame. Said wire 22 may be of a separate piece of material, if desired, and may be soldered or otherwise attached to the bridge end 15, or may form one leg of the U, as has been hereinbefore explained, in connection with the rivets 18. In order to secure an adjustable non-metallic composition nose guard as 23 to the rear end of the wire 22, said wire may terminate in a suitable spear end 24 whose greatest width is preferably greater than the diameter of the wire.

In any case, both the rivets 18 and the wire 22 may be independent of each other, and screwed instead of permanently secured to the bridge end 15, so that the bridge may be removed, if desired, and another substituted therefor.

The spear 24 may be inserted into the interior of the composition guard 23 by warming the guard sufficiently to soften it and then forcing it on to the spear, surrounded by a suitable cement, such as is well known in the art, or the warming of the guard may be omitted and dependence had upon pressure alone to force the spear inside of the guard, and on the cement to maintain the parts in fixed relation, or both heat and pressure may be employed.

In this construction, it will be seen that both the rivet 18 and the wire rod 22, fitting as they do quite closely into the holes in the lens frame, and at least one of the rivets being headed, prevent any possibility of relative movement between the bridge end 15 and the lens frame into which it is inserted, the groove 16 aiding towards this end by supporting the back, sides and bottom surface of the bridge. It will further be seen that the nose guard 23 may be adjusted in any direction including forwardly and upwardly so as to accurately fit the nose of the wearer. While the nose guard 23 has been described as being made of composition, it will be understood that other material may be used for this purpose, such as metal and that the end of the wire 22 may be properly secured thereto in any well known manner.

It will be seen that the lens frame 12, by not being restricted or clamped at any point immediately adjacent the lens groove 11, by reason of its peculiar connection to the bridge, is free to stretch at all points during the operation of inserting the lens into the groove 11, in a manner not heretofore possible with the types of clamps previously used for connecting the bridge to a composition frame.

It will also be seen that the bridge 12 makes an extremely rigid connection between the frames, and by preventing relative movement thereof under ordinary conditions of use insures long life to the frame by preventing the metal at any point from cutting thereinto.

It will further be seen that I have provided a simple, effective and economical construction whereby the frames may be rigidly connected and a nose guard mounted for easy adjustment in all directions; that the invention may readily be applied to removable bridges, and that the bridge presents an ornamental high bridge effect with low bridge construction.

While I have shown and described a preferred embodiment of my invention, I do not wish to be understood as limiting myself thereto but intend to claim my invention as broadly as may be permitted by the state of the prior art and the terms of the appended claims.

I claim:

1. In an optical mounting, a pair of lens frames, each having a groove therein extending rearwardly from the front face thereof partway through the frame and provided with a rear face, sides and a bottom, a metallic bridge, ends on said bridge, each inserted into frictional engagement with the rear face, sides and bottom of one of said grooves, and securing means for said ends passing through the lens frame from the groove thereof to the rear face of the frame and secured to and terminating at the rear face of said bridge.

2. In an optical mounting, a pair of non-metallic lens frames, each having a substantially vertical groove therein, a non-resilient metallic wire bridge rigidly but adjustably connecting said frames and comprising a connecting part and integral depending ends at substantially right angles to said part and substantially vertical to enter the grooves of said frames, each of said ends being inserted into one of the grooves of one of the frames with the front face of said end lying substantially in the same plane as the front face of the frame, and means engaging said bridge and said frame for securing the end of the bridge in place to the frame and for preventing movement thereof relatively to said frame and thereby preventing enlargement of the grooves, including an elongated holding member soldered to the rear face of the bridge end and extending rearwardly therefrom.

3. In an optical mounting, a pair of composition lens frames, each having a groove on the front face thereof, bounded by a rear surface intermediate the front and rear surfaces of the frame, by substantially upright sides and by a horizontal bottom, a non-resilient metallic bridge rigidly securing said frames together, each end of said bridge being inserted into one of the grooves with the front face thereof parallel to the plane of the rear surface of the groove and to the plane of the front of the frame, and a pair of rearwardly directed elongated fastening members securing each end of the bridge in the groove of its respective frame and maintaining the bridge end against movement in the groove.

4. The combination with a pair of composition lens frames, each having a substantially upright groove therein passing rearwardly part-way through the thickness thereof, of a non-resilient metallic bridge rigidly securing adjacent portions of said frames together, the ends of said bridge each being substantially vertical and being inserted respectively into one of the grooves of said frames, with the rear face of the bridge end arranged intermediate the front and rear faces of the frame, and the front face of said end parallel to the plane of the front of the frame, and securing means for each end of said bridge comprising an elongated fastening member soldered to the rear face of said end and extending rearwardly of said end and passing into that portion of the frame behind said end, and having a headed part engaging the frame.

5. In an optical mounting, a wire bridge, substantially upright depending end portions on said bridge, a pair of non-metallic lens frames of greater thickness from front to back than that of the end portions, each of the frames having a lens groove therein, and having a substantially upright groove spaced from the lens groove and arranged between the peripheral edges of the frame and terminating in a substantially flat face spaced forwardly of the rear face of the frame, and into which groove the bridge end portion is inserted, and a rearwardly extending perforation meeting the back of the upright groove, said end portion being supported along its rear surface, sides and bottom by the back, sides and bottom of the upright groove with its front face exposed, and a rearwardly extending securing element for each of said bridge end portions arranged in the perforation and secured to one of said end portions and to the frame.

6. In an optical mounting, a metallic bridge, substantially upright end portions on said bridge, a pair of non-metallic lens frames, each having a lens groove, and having a substantially upright groove spaced inwardly of the lens groove, and of less depth measured from front to rear than that of the frame, and receiving one of the bridge end portions, the back, sides and bottom of the upright groove supporting said end against movement in said groove, and a pair of spaced parallel rearwardly extending perforations meeting the upright groove, a fastening member for each bridge end portion passing through one of said perforations for securing said end portion in place in the frame, and a second fastening member for the bridge end portion secured to the end portion and passing through the other perforation beyond the rear part of the frame, and adapted to enter a nose guard, said fastening members cooperating to prevent movement of the bridge end portion relatively to the back, sides and bottom of the groove when force is exerted on the frames or bridge, and cooperating with the back, sides and bottom of the groove for that purpose.

7. In an optical mounting, a metallic substantially U-shaped bridge having spaced and substantially parallel end portions, a non-metallic lens frame having a face groove therein open at the front and top and of insufficient depth to pass completely through the frame and of the size and shape of one of the bridge end portions, said portion being inserted into the groove with the front face of said end portion exposed, said groove having a rearwardly directed perforation therein meeting the groove, a headed fastening member in said perforation secured to the end portion, and a second elongated fastening member secured to the end portion below the first-mentioned fastening member and of sufficient length to extend into, and beyond the rear face of, the frame, and thereby aiding to secure the bridge in place, the rear extremity of the elongated member beyond the rear face of the frame being adapted to be secured to a nose guard.

8. In an optical mounting, a lens frame of non-metallic material provided with a face groove open at the top and at the front of the frame and having a back surface arranged in a plane parallel and intermediate of the planes of the front and back of the frame, a metallic bridge substantially in the shape of an inverted U and of flat wire substantially uniform in cross-section throughout, having its end portion inserted into said face groove and supported by the surfaces thereof against movement relatively to the frame under the stress of handling the mounting and having its front face exposed at the front of the frame, a securing member extending rearwardly from the rear face of the bridge end and passing through that portion of the frame behind the back of the groove toward the rear face of the frame for aiding the groove to secure the bridge end permanently to the frame, an elongated metallic fastening member secured to the rear face of the bridge end and similarly extending through the same portion of the frame rearwardly to cooperate with the securing member to hold the bridge end against rotation relatively to the frame and being adapted to be forcibly inserted into a nose guard.

9. In an optical mounting, a non-metallic lens frame, a metallic bridge, and means for securing the end of said bridge to the frame including a substantially flat groove back in the frame lying intermediate the front and rear surfaces of the frame and of less height than that of said frame and of less width than that between the peripheral surfaces of the frame, a pair of substantially parallel spaced groove sides arranged substantially perpendicularly to the back and joining said back at the edges thereof, and extending to the front face of the frame, a substantially horizontal bottom joining said sides and back and extending to the front face of the frame, said bridge end being of substantially the same size and shape as the groove, a securing member secured to the rear face of the bridge end and extending from said back toward the rear face of the frame, and a second securing member secured to the rear face of the bridge end at a point spaced from said first-mentioned member whereby said sides, back, and said members serve to maintain the bridge end in position in the frame and prevent the bridge end from cutting into the non-metallic material of the frame under the stress of handling the mounting.

10. In an optical mounting, a pair of non-metallic lens frames each having a face groove therein below the top and above the bottom of the frame, and open only at the front and top and extending rearwardly from the front face thereof part-way through the thickness thereof, a non-resilient metallic bridge substantially rigidly connecting the frames and having a substantially horizontal part and substantially parallel ends connected by and integral with the horizontal part, each of said ends being inserted into and held in place by said groove against lateral and transverse displacement with the rear face of the bridge end covered by the back of the groove and the sides of the bridge end supported by the sides of the groove, and elongated securing members for the ends of the bridge connected to said ends and passing from said ends rearwardly into the frame and preventing rotation of the bridge end in the groove, and consequent cutting of the sides of the grooves by said bridge end.

11. In an optical mounting, a non-resilient bridge of flat metallic wire, a pair of non-metallic lens frames, a pair of substantially vertical end portions on said bridge, said end portions being similar to, and arranged in spaced relation to each other, and means for securing each of said end portions to the front face of the respective frames at corresponding portions of said frames, comprising an elongated metallic fastening element, solder securing the front end of said element to the rear face of the bridge end portion to arrange said element with its axis extending rearwardly at substantially right angles to the plane of the rear face of the bridge end portion to which it is secured, a second elongated metallic fastening element arranged below the first-mentioned element, solder securing the front end of said second element to the rear face of said end portion, one of said fastening elements being adapted to be forced into a composition nose-guard by heat and pressure and extending rearwardly a sufficient distance to enter said nose guard, and an enlarged spear-shaped end portion on said last mentioned element, said spear-shaped portion having converging side edges meeting at a point at the extreme rear end of the element and being widened to prevent retraction of said element after the element has been forced into said nose guard.

12. The combination with a pair of non-metallic lens frames, of a non-resilient metallic bridge of U-shaped form joining said frames, a pair of integral depending spaced end portions on said bridge having the front faces thereof arranged in the same plane, said end portions being of substantially the same size and shape, an elongated metallic fastening member for each of the end portions, soldered at its front end to the rear face of the end portion and extending rearwardly of the end portion and entering that part of the non-metallic material of the frame immediately behind said bridge end portion, and a second elongated metallic fastening member below the first-mentioned fastening member soldered at its front end to the rear face of the end portion and passing through the frame, and a widened and pointed spear-shaped rear end portion on at least one of the members.

13. In an optical mounting, a metallic bridge, depending end portions on the bridge, the front faces of said end portions lying in the same plane and being exposed to view at the front of said mounting, a pair of non-metallic lens frames, and means for securing each of said bridge end portions to a corresponding point of each of the frames comprising a pair of vertically spaced rearwardly directed metallic fastening members, solder securing the front end of each of said members to the rear face of the bridge end portion, an enlarged head at the rear end of one of the members and a transversely widened and pointed spear-shaped end portion on the rear end of the other of said members, of sufficient length to be imbedded in a nose guard.

14. In an optical mounting, a pair of non-metallic lens frames, a metallic bridge, spaced depending end portions on the bridge, rear faces on said end portions lying in the same plane and each arranged in contact with one of the lens frames, exposed front faces on said end portions, and means for securing each of said end portions to the non-metallic frames comprising a pair of independent vertically spaced, parallel and rearwardly directed metallic fastening members, solder securing the front end of each of said members to the rear face of the bridge end portion, and a headed rear end portion on each of said members, at least one of said headed portions being widened transversely across the entire width of said member and terminating in a point whereby said member may be imbedded into a composition member by heat and pressure and is retained in the member in which it is imbedded on the cooling thereof.

EMANUEL PAPPERT.